US009699236B2

(12) United States Patent
Gopalakrishnan et al.

(10) Patent No.: US 9,699,236 B2
(45) Date of Patent: Jul. 4, 2017

(54) SYSTEM AND METHOD OF ADAPTIVE BIT-RATE STREAMING

(71) Applicant: AT&T Intellectual Property I, L.P., Atlanta, GA (US)

(72) Inventors: Vijay Gopalakrishnan, Edison, NJ (US); Rittwik Jana, Parsipanny, NJ (US); Seungjoon Lee, Basking Ridge, NJ (US); Kadangode K. Ramakrishnan, Berkeley Hgts., NJ (US); Kyung-Wook Hwang, Fort Lee, NJ (US); Vishal Misra, New York, NY (US); Daniel Rubenstein, New York, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 170 days.

(21) Appl. No.: 14/109,238

(22) Filed: Dec. 17, 2013

(65) Prior Publication Data
US 2015/0172352 A1    Jun. 18, 2015

(51) Int. Cl.
*G06F 15/16*    (2006.01)
*H04L 29/06*    (2006.01)
(Continued)

(52) U.S. Cl.
CPC .......... *H04L 65/608* (2013.01); *H04L 67/108* (2013.01); *H04L 67/1085* (2013.01);
(Continued)

(58) Field of Classification Search
CPC .............. H04L 29/08072; H04L 29/06; H04L 29/08117
See application file for complete search history.

(56) References Cited

U.S. PATENT DOCUMENTS 6,794,567 B2 *  9/2004  Hughes ................ G10H 1/0058
                                                      84/609
7,174,385 B2 *  2/2007  Li ........................ H04L 65/4084
                                                      709/228
(Continued)

FOREIGN PATENT DOCUMENTS

EP    2044771 A2    4/2009
WO    2008012488 A2    1/2008
WO    2011119132 A2    9/2011

OTHER PUBLICATIONS

Akyol, E. et al., A Flexible Multiple Description Coding Framework for Adaptive Peer-to-Peer Video Streaming, IEE Journal of Selected Topics in Signal Processing, vol. 1, No. 2, Aug. 2007, pp. 231-245.
(Continued)

*Primary Examiner* — Vivek Srivastava
*Assistant Examiner* — Atta Khan
(74) *Attorney, Agent, or Firm* — Toler Law Group, PC

(57) ABSTRACT

A method includes receiving information from a tracker device indicating that a plurality of devices is associated with a media content item. The method also includes establishing peer-to-peer sessions with a first group and a second group of the devices, selecting the first group based on a first bit-rate satisfying a threshold bit-rate, and sending a first request, via a first peer-to-peer session, to a first device of the first group. The media content item is divided into a plurality of chunks. The first request identifies a first chunk. The method also includes receiving the first chunk, modifying the threshold bit-rate based on a number of buffered chunks, and selecting the second group based on a second bit-rate satisfying the modified threshold bit-rate. The method also includes sending a second request to a second device of the second group. The second request identifies a second chunk.

20 Claims, 7 Drawing Sheets

(51) Int. Cl.
  *H04N 21/63* (2011.01)
  *H04N 21/845* (2011.01)
  *H04N 21/854* (2011.01)
  *H04L 29/08* (2006.01)

(52) U.S. Cl.
  CPC ....... *H04N 21/632* (2013.01); *H04N 21/8456* (2013.01); *H04N 21/85406* (2013.01)

(56) References Cited

U.S. PATENT DOCUMENTS

| | | | |
|---|---|---|---|
| 7,480,441 B2 | 1/2009 | Klausberger et al. | |
| 7,584,289 B2* | 9/2009 | Pharn | H04L 65/80 709/230 |
| 7,664,109 B2 | 2/2010 | Li | |
| 7,903,652 B2 | 3/2011 | Huang et al. | |
| 7,945,694 B2* | 5/2011 | Luzzatti | H04L 29/06027 709/201 |
| 7,991,906 B2 | 8/2011 | Ng et al. | |
| 8,015,311 B2 | 9/2011 | Liu | |
| 8,051,161 B2* | 11/2011 | Hu | H04L 67/104 709/223 |
| 8,131,971 B2 | 3/2012 | Zuckerman et al. | |
| 8,169,916 B1 | 5/2012 | Pai et al. | |
| 8,352,585 B2 | 1/2013 | Hu et al. | |
| 8,356,111 B2 | 1/2013 | Luzzatti et al. | |
| 8,375,140 B2* | 2/2013 | Tippin | H04N 21/23424 386/343 |
| 8,385,267 B2 | 2/2013 | Wu | |
| 8,386,630 B1* | 2/2013 | Atzmon | H04L 65/605 455/41.2 |
| 8,407,280 B2* | 3/2013 | Zanger | H04L 67/06 709/202 |
| 8,417,794 B2* | 4/2013 | Zanger | H04L 41/0896 370/242 |
| 8,447,813 B2 | 5/2013 | Redmond | |
| 8,477,658 B2 | 7/2013 | Tsang et al. | |
| 8,494,004 B2 | 7/2013 | Dettori et al. | |
| 8,509,753 B2 | 8/2013 | Chandra et al. | |
| 8,510,562 B2 | 8/2013 | Ramakrishnan et al. | |
| 8,527,845 B2 | 9/2013 | Souza et al. | |
| 8,549,126 B2 | 10/2013 | Takeda et al. | |
| 8,650,301 B2* | 2/2014 | Luzzatti | H04L 47/765 709/224 |
| 2004/0203902 A1* | 10/2004 | Wilson | H04W 64/00 455/456.1 |
| 2006/0080454 A1 | 4/2006 | Li | |
| 2008/0104643 A1 | 5/2008 | Shao et al. | |
| 2008/0133767 A1 | 6/2008 | Birrer et al. | |
| 2008/0307107 A1 | 12/2008 | Chen et al. | |
| 2009/0037968 A1 | 2/2009 | Liu et al. | |
| 2009/0106393 A1 | 4/2009 | Parr et al. | |
| 2009/0182815 A1 | 7/2009 | Czechowski, III et al. | |
| 2009/0193476 A1 | 7/2009 | Straub et al. | |
| 2009/0300673 A1* | 12/2009 | Bachet | H04N 7/17318 725/31 |
| 2009/0327395 A1* | 12/2009 | Park | H04W 8/005 709/202 |
| 2010/0153578 A1 | 6/2010 | Van Gassel et al. | |
| 2010/0332671 A1 | 12/2010 | Alfonso et al. | |
| 2011/0055328 A1* | 3/2011 | Lahr | H04L 67/104 709/204 |
| 2011/0072143 A1* | 3/2011 | Kuo | H04L 67/104 709/230 |
| 2011/0131278 A1 | 6/2011 | Nieh et al. | |
| 2011/0219137 A1 | 9/2011 | Yang et al. | |
| 2011/0225312 A1 | 9/2011 | Liu et al. | |
| 2011/0258322 A1 | 10/2011 | Luzzatti et al. | |
| 2012/0030303 A1 | 2/2012 | Souza et al. | |

OTHER PUBLICATIONS

Hou, Y.T. et al., Network Bandwidth Sharing for Transporting Rate-Adaptive Packet Video Using Feedback, Global Telecommunications Conference, GLOBECOM 1998, The Bridge to Global Integration, 1998, IEEE, vol. 3, pp. 1547-1555.

Shen, Yanming et al., Streaming Layered Encoded Video Using Peers, International Conference on Multimedia and Expo, ICME 2005, IEEE, Jul. 2005, 4 pages.

Taal, J.R. et al., Scalable Multiple Description Coding for Video Distribution in P2P Networks, 24th Picture Coding Symposium, San Francisco, Dec. 2004, 6 pages.

Choe, Y. et al., "Improving VoD Server Efficiency with BitTorrent", Multimedia 2007, Proceedings for the 15th International Conference on Multimedia, Sep. 23-28, 2007, ACM, New York, NY, 10 pages.

Erman, D. et al., "On Piece Selection for Streaming BitTorrent", Fifth Swedish National Computer Networking Workshop, Jan. 1, 2008, 4 pages.

International Search Report and Written Opinion for International Application No. PCT/US2014/069972 mailed on Mar. 9, 2015, 13 pages.

Park, H., "Peer-to-Peer Networks—Protocols, Cooperation and Competition", Streaming Media Architectures, Techniques, and Applications, Jan. 1, 2011, IGI Global, pp. 262-294.

Rodrigues, P. et al., "BitTorrent Based Transmission of Real-Time Scalable Video Over P2P Networks", 7th Iberian Conference on Information Systems and Technologies, Jun. 23, 2012, pp. 1-6.

Sandvik, P. et al., "The Distance-Availability Weighted Piece Selection Method for BitTorrent: A BitTorrent Piece Selection Method for On-Demand Streaming", First International Conference on Advances in P2P Systems, IEEE, NJ, Oct. 11, 2009, pp. 198-202.

Shah, P. et al., "Peer-to-Peer Multimedia Streaming Using BitTorrent", Performance, Computing, and Communications Conference, IEEE, Apr. 1, 2007, pp. 340-347.

Walker, J., et al., "Share It!—The Architecture of a Rights-Managed Network of Peer-to-Peer Set-Top-Boxes", Computer as a Tool, IEEE, Region 8 Eurocon 2003, Sep. 22-24, 2003, pp. 251-255.

* cited by examiner

SYSTEM AND METHOD OF ADAPTIVE BIT-RATE STREAMING

FIELD OF THE DISCLOSURE

The present disclosure is generally related to adaptive bit-rate streaming.

BACKGROUND

Video traffic across wired or wireless networks may be managed using an adaptive bit-rate (ABR) approach or using peer-to-peer (P2P) delivery. An adaptive bit-rate approach may include encoding a video at multiple playback bitrates and providing a video at different playback bitrates based on an available bandwidth. For example, higher fidelity video corresponding to a higher playback bit-rate may be provided when higher bandwidth is available. When bandwidth availability is low, lower quality video corresponding to a lower playback bit-rate may be provided to prevent a playback interruption. Applying the adaptive bit-rate approach in a peer-to-peer delivery system may be difficult.

DETAILED DESCRIPTION

Figure 1:
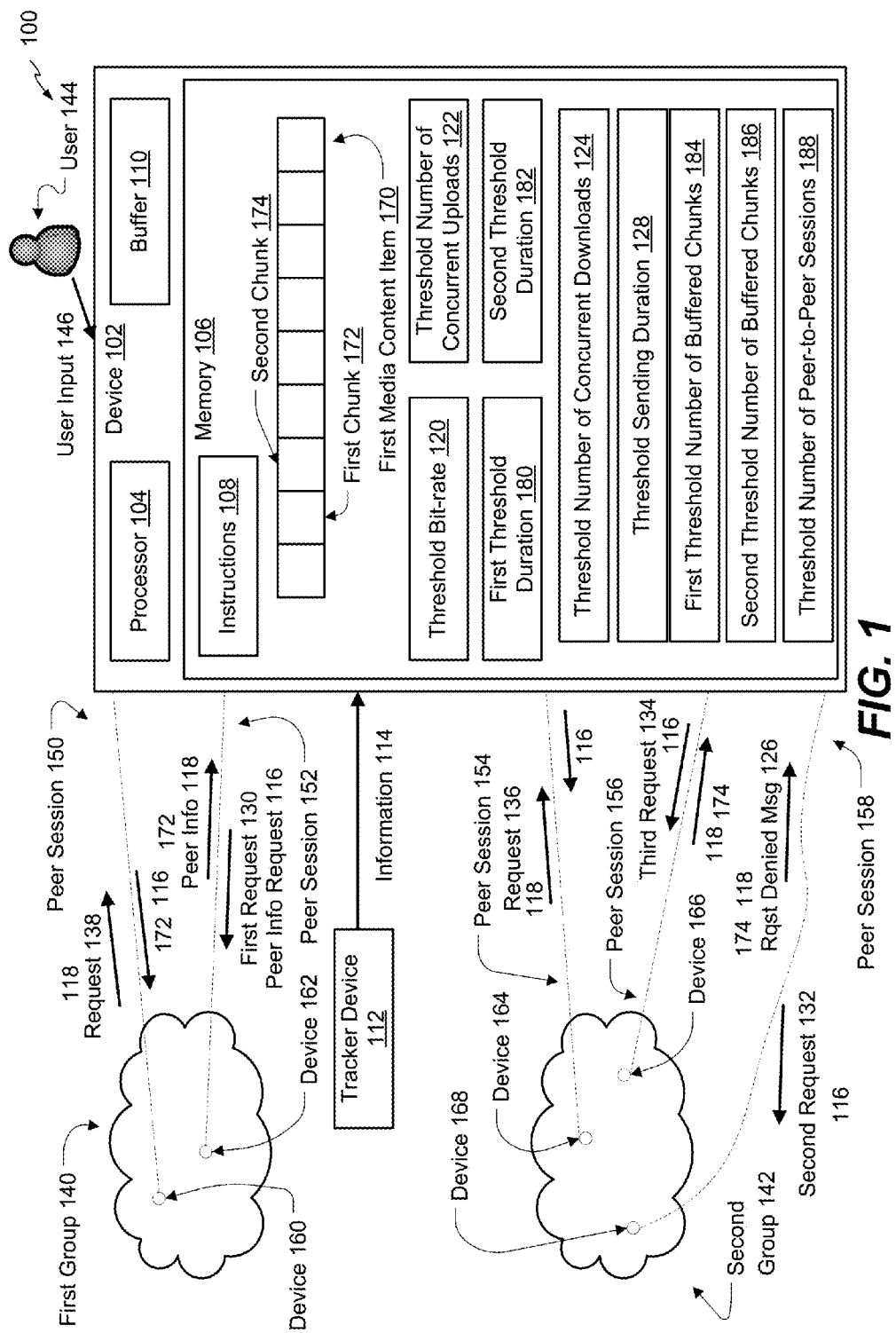
FIG. 1 is a diagram of a particular illustrative embodiment of a system that uses adaptive bit-rate streaming.

Systems and methods of adaptive bit-rate streaming are disclosed. A peer-to-peer system may use a group of devices (also referred to as a 'swarm') that are associated with a particular media content item. The particular media content item may include a video. For example, a swarm may be composed of devices that have (e.g., store) portions of the particular media content item. To illustrate, a user may view a portion of the particular media content item at a device and may abandon viewing before reaching an end of the particular media content item. For example, the user may switch to watching another media content item. The device may store the portion of the particular media content item. The device may participate in a particular swarm to receive the particular media content item associated with the swarm and may exchange chunks of the particular media content item with other peer devices. A single media content item may be associated with multiple files, each file corresponding to a different playback bit rate.

A different swarm may correspond to each playback bit-rate of the particular media content item. A device may concurrently join different swarms associated with the particular media content item and may maintain active peer-to-peer sessions with peer devices in each of the different swarms. In a particular embodiment, the device may concurrently join different swarms associated with a plurality of media content items. For example, the device may join a first set of swarms associated with the particular media content item and a second set of swarms associated with another media content item.

A device may dynamically adjust a playback bit-rate of a media content item based on changes in available bandwidth. For example, the device may determine the available bandwidth based on a number of buffered chunks. When the number of buffered chunks exceeds a first threshold, indicating higher bandwidth availability, the device may request chunks corresponding to a higher playback bit-rate from a peer device of a swarm that corresponds to the higher playback bit-rate. Alternatively, when the number of buffered chunks is lower than a second threshold, indicating lower bandwidth availability, the device may request chunks corresponding to a lower playback bit-rate from a peer device of a swarm that corresponds to the lower playback bit-rate. Thus, an adaptive bit-rate approach may be combined with peer-to-peer delivery by providing different swarms of peer devices that correspond to each playback bit-rate of a media content item.

In a particular embodiment, a method includes receiving information from a tracker device. The information indicates that a plurality of devices is associated with a first media content item. The information may also indicate one or more bit-rates at which at least a portion of the first media content item is available. The method also includes establishing peer-to-peer sessions with a first group of the plurality of devices and a second group of the plurality of devices. The method further includes selecting the first group based on a first bit-rate associated with the first group satisfying a threshold bit-rate. The method also includes sending a first request, via a first peer-to-peer session of the peer-to-peer sessions, to a first device of the first group. The first media content item is divided into a plurality of chunks. The first request identifies a first chunk of the plurality of chunks. The method further includes receiving the first chunk from the first device and modifying the threshold bit-rate based on a number of buffered chunks. The method also includes selecting the second group based on a second bit-rate associated with the second group satisfying the modified threshold bit-rate. The method further includes sending a second request, via a second peer-to-peer session of the peer-to-peer sessions, to a second device of the second group. The second request identifies a second chunk of the plurality of chunks.

In another particular embodiment, a device includes a processor and a memory. The memory stores instructions that, when executed by the processor, cause the processor to perform operations. The operations include receiving information that identifies a plurality of devices that store a segment of a first media content item. The operations also include establishing peer-to-peer sessions with a first group of the plurality of devices and a second group of the plurality of devices. The operations further include selecting the first group based on a first bit-rate and sending a first request, via a first peer-to-peer session of the peer-to-peer sessions, to a first device of the first group. The first media content item includes a plurality of segments. The first request identifies a first segment of the plurality of segments. The operations also include receiving the first segment from the first device. The operations further include selecting the second group based on a second bit-rate, the second bit-rate selected in response to a number of buffered segments. The operations also include sending a second request, via a second peer-to-peer session of the peer-to-peer sessions, to a second device of the second group. The second request identifies a second segment of the plurality of segments.

In another particular embodiment, a computer-readable storage device stores instructions that, when executed by a processor, cause the processor to perform operations including receiving information. The information indicates that a plurality of devices is associated with a first media content item. The operations also include establishing peer-to-peer sessions with a first group of the plurality of devices and a second group of the plurality of devices. The operations further include selecting the first group based on a first bit-rate. The operations also include sending a first request, via a first peer-to-peer session of the peer-to-peer sessions, to a first device of the first group. The first media content item is divided into a plurality of chunks. The first request identifies a first chunk of the plurality of chunks. The operations further include receiving the first chunk from the first device. The operations also include selecting the second group based on a second bit-rate, the second bit-rate selected in response to a number of buffered chunks. The operations further include sending a second request, via a second peer-to-peer session of the peer-to-peer sessions, to a second device of the second group. The second request identifies a second chunk of the plurality of chunks. The operations also include receiving a plurality of requests from a first subset of the plurality of devices. Each of the plurality of requests identifies a particular chunk of the plurality of chunks and a playback deadline of the particular chunk. The operations further include identifying a particular request of the plurality of requests based on a first playback deadline of the particular request. The operations also include sending the first chunk to a requesting device of the plurality of devices. The particular request is received from the requesting device and the particular request identifies the first chunk.

Referring to FIG. 1, a particular illustrative embodiment of a system is disclosed and generally designated 100. The system 100 includes a device 102. The system 100 may include a plurality of groups (e.g., a first group 140 and a second group 142) of devices. For example, the first group 140 includes devices 160 and 162. The second group 142 includes devices 164, 166, and 168. A group may also be referred to as a swarm. A particular group may correspond to a particular bit-rate of a particular media content item. For example, the first group 140 may correspond to a first bit-rate (e.g., 250 kilobytes per second (Kbps)) of the first media content item 170. As another example, the second group 142 may correspond to a second bit-rate (e.g., 750 Kbps) of the first media content item 170. In a particular embodiment, groups (e.g., the first group 140 and the second group 142) may overlap. For example, a device (e.g., the devices 160, 162, 164, 166, or 168) may be included in more than one group. To illustrate, the device (e.g., the devices 160, 162, 164, 166, or 168) may store data associated with a first bit-rate of the first media content item 170 and data associated with a second bit-rate of the first media content item 170. The system 100 may include a tracker device (e.g., a tracker device 112). In a particular embodiment, the tracker device 112 may also be a member of one or more groups (e.g., the first group 140 and the second group 142). The tracker device 112 may store information (e.g., information 114) indicating devices (e.g., the devices 160, 162, 164, 166, 168, and 102) associated with each media content item (e.g., the first media content item 170).

The device 102 includes a processor 104 coupled to a memory 106 and coupled to a buffer 110. The memory 106 may include processor-executable instructions 108. The memory 106 may include at least a portion of a media content item (e.g., the first media content item 170). The first media content item 170 may correspond to audio, video, or both. The first media content item 170 may be divided into a plurality of chunks (or segments). For example, the plurality of chunks may include a first chunk 172 and may include a second chunk 174. In a particular embodiment, each chunk of the plurality of chunks of the first media content item 170 may be equal in size to each other chunk. For example, a playback length (e.g., 10 seconds) of each of the plurality of chunks may be equal.

The memory 106 may include data indicating a threshold bit-rate 120, a threshold number of concurrent uploads 122, a threshold number of concurrent downloads 124, a first threshold duration 180, a second threshold duration 182, a threshold sending duration 128, a first threshold number of buffered chunks 184, a second threshold number of buffered chunks 186, a threshold number of peer-to-peer sessions 188, or a combination thereof. In a particular embodiment, the data may include default values. For example, the threshold bit-rate 120 may be a moderate bit-rate (e.g., 500 Kbps). The threshold number of concurrent uploads 122 may be a default number (e.g., 5) of concurrent uploads. The threshold number of concurrent downloads 124 may be a default number (e.g., 5) of concurrent downloads. The first threshold duration 180 (e.g., 30 seconds) may be higher than the second threshold duration 182 (e.g., 10 seconds). The threshold sending duration 128 may be a default sending duration (e.g., 5 seconds). The first threshold number of buffered chunks 184 may be higher than a second threshold number of buffered chunks 186. For example, the first threshold number of buffered chunks 184 may be a default number (e.g., 5) of chunks corresponding to a particular playback duration (e.g., 50 seconds). The second threshold number of buffered chunks 186 may be a default number (e.g., 2) of chunks corresponding to another particular playback duration (e.g., 20 seconds). The threshold number of peer-to-peer sessions 188 may be a default number (e.g., 80) of peer-to-peer sessions. In a particular embodiment, the threshold number of peer-to-peer sessions 188 may also indicate a threshold number of download (e.g., 50) peer-to-peer sessions. In this embodiment, the remaining peer-to-peer sessions (e.g., 80−50=30) may be used as upload peer-to-peer sessions. The threshold number of download peer-to-peer sessions may be a default number (e.g., 50).

In a particular embodiment, at least a portion of the data indicating the threshold bit-rate 120, the threshold number of concurrent uploads 122, the threshold number of concurrent downloads 124, the first threshold duration 180, the second threshold duration 182, the threshold sending duration 128, the first threshold number of buffered chunks 184, the second threshold number of buffered chunks 186, the threshold number of peer-to-peer sessions 188, or a combination thereof, may be determined based on user input. For example, the device 102 may receive user input (e.g., user input 146) from a user (e.g., a user 144) indicating at least the portion of the data. To illustrate, the user 144 may use a settings application on the device 102 to add or modify the data via the user input 146. For example, the settings application may display the default values. The user 144 may use a touch screen (or other input device) to increase (e.g., from 5 to 6) the threshold number of concurrent downloads 124. The device 102 may store the updated value of the threshold number of concurrent downloads 124 in the memory 106. The device 102 may include fewer or more than the illustrated components.

During operation, the device 102 may send a request for the information 114 to the tracker device 112. The request may identify the first media content item 170. In a particular embodiment, the device 102 may identify the tracker device 112 based on the user input 146 received from the user 144. For example, the user input 146 may include identifying information (e.g., a uniform resource identifier (URI), such as a uniform resource locator (URL)) of the tracker device 112. In a particular embodiment, the settings application may include a default value corresponding to the identifying information. In response to receiving the request, the tracker device 112 may modify the information 114 to indicate that the device 102 is associated with the first media content item 170. The tracker device 112 may send the information 114 to the device 102. In a particular embodiment, the tracker device 112 may send a subset of the information 114 that is associated only with the first media content item 170. The information 114 may indicate that a plurality of devices (e.g., the devices 160, 162, 164, 166, 168, and 102) is associated with the first media content item 170. The information 114 may also include other information regarding the first media content item 170. For example, the information 114 may indicate one or more bit-rates at which at least a portion of the first media content item 170 is available. For example, the information 114 may indicate that at least one chunk (or segment) of the first media content item 170 is available at a first bit-rate (e.g., 250 Kbps) and that at least one chunk (or segment) of the first media content item 170 is available at a second bit-rate (e.g., 750 Kbps).

In response to receiving the information 114, the device 102 may send a peer information request to one or more of the plurality of devices associated with the first media content item 170. For example, the device 102 may send a peer information request 116 to the devices 160, 162, 164, 166, and 168. In response to the peer information request (e.g., the peer information request 116), the one or more of the plurality of devices may send peer information (e.g., peer information 118) to the device 102. The peer information may indicate which chunks of first media content item 170 are available for transmission. For example, the device 102 may receive the peer information 118 from the device 162 indicating that the device 162 has the first chunk 172 available for transmission at a first bit-rate (e.g., 250 Kbps) and from the device 160 indicating the device 160 has a third chunk of the first media content item 170 available for transmission at the first bit-rate (e.g., 250 Kbps). As another example, the device 102 may receive the peer information 118 from the device 164 indicating that the device 164 has the first chunk 172 available for transmission at a second bit-rate (e.g., 750 Kbps).

In a particular embodiment, the peer information 118 may indicate that a device has multiple chunks available for transmission. For example, the device 102 may receive the peer information 118 from the device 166 indicating that the device 166 has the first chunk 172 and the second chunk 174 available for transmission at the second bit-rate (e.g., 750 Kbps). As another example, the device 102 may receive the peer information 118 from the device 168 indicating that the device 168 has the first chunk 172, the second chunk 174, and the third chunk available for transmission at the second bit-rate (e.g., 750 Kbps).

In a particular embodiment, a device (e.g., the device 160, 162, 164, 166, or 168) may store chunks of the first media content item 170 corresponding to multiple bit-rates. For example, the device may be included in the first group 140 and in the second group 142. In this embodiment, the peer information 118 from the device may indicate that the device has a first particular chunk available at the first bit-rate (e.g., 250 Kbps) and has a second particular chunk available at the second bit-rate (e.g., 750 Kbps). In a particular embodiment, the peer information request 116 may indicate a particular bit-rate (e.g., 250 Kbps). A device (e.g., the device 160, 162, 164, 166, or 168) may respond with the peer information 188 indicating chunks that are available at the device at the particular bit-rate (e.g., 250 Kbps). For example, the device included in both the first group 140 and the second group 142 may respond to a peer information request 116 indicating the first bit-rate with the peer information 118 indicating that the first particular chunk is available.

The device 102 may identify a plurality of groups (e.g., the first group 140 and the second group 142) associated with different bit-rates (e.g., 250 Kbps, 500 Kbps, 750 Kbps, 1000 Kbps) of the first media content item 170. For example, the device 102 may receive the peer information 118 from at least one device (e.g., at least one of the devices 160 and 162) indicating that at least one chunk is available for transmission at the first bit-rate (e.g., 250 Kbps). In response to the peer information 118 indicating that at least one chunk is available at the first bit-rate (e.g., 250 Kbps), the device 102 may determine that there is a group (e.g., the first group 140) associated with the first bit-rate (e.g., 250 Kbps). As another example, the device 102 may receive the peer information 118 from at least one device (e.g., at least one of the devices 164, 166, and 168) indicating that at least one chunk is available for transmission at the second bit-rate (e.g., 750 Kbps). In response to receiving the peer information 118 indicating that at least one chunk is available at the second bit-rate (e.g., 750 Kbps), the device 102 may determine that there is a group (e.g., the second group 142) associated with the second bit-rate (e.g., 750 Kbps).

In a particular embodiment, the information 114 may indicate one or more bit-rates (e.g., the first bit-rate and the second bit-rate) at which the first media content item 170 (or portions thereof) is available. In this embodiment, the device 102 may determine that there is a group associated with each of the one or more bit-rates. For example, the device 102 may determine that there is a group (e.g., the first group 140) associated with the first bit-rate (e.g., 250 Kbps) and that there is another group (e.g., the second group 142) associated with the second bit-rate (e.g., 750 Kbps).

In response to determining that the peer information 118 indicating that at least one chunk is available for transmission at the first bit-rate (e.g., 250 Kbps) is received from the devices 160 and 162, the device 102 may determine that the first group 140 includes at least the devices 160 and 162. Similarly, in response to determining that the peer information 118 indicating that at least one chunk is available for transmission at the second bit-rate (e.g., 750 Kbps) is received from the devices 164, 166, and 168, the device 102 may determine that the second group 142 includes at least the devices 164, 166, and 168.

The device 102 may establish a peer-to-peer session with the plurality of groups (e.g., the first group 140 and the second group 142). In a particular embodiment, the device 102 may establish a peer-to-peer session with at least one device of each of the plurality of groups (e.g., the first group 140 and the second group 142). For example, the device 102 may establish peer-to-peer sessions 150, 152, 154, 156, and 158 with the devices 160, 162, 164, 166, and 168, respectively.

In a particular embodiment, the device 102 may establish a number of peer-to-peer sessions up to the threshold number of peer-to-peer sessions 188. For example, the device 102 may disable an existing peer-to-peer session prior to establishing a new peer-to-peer session when the number of peer-to-peer sessions at the device 102 is equal to the threshold number of peer-to-peer sessions 188. In a particular embodiment, the device 102 may select the existing peer-to-peer session that is to be disabled randomly, based on a time lapse (most recently used or least recently used) since the existing peer-to-peer session was previously used (to receive, to send, or either), based on when the existing peer-to-peer session was established (oldest or newest), or a combination thereof.

The device 102 may select a particular group of the first group 140 and the second group 142 based on a bit-rate associated with the particular group corresponding to the threshold bit-rate 120. For example, the first bit-rate (e.g., 250 Kbps) may be associated with the first group 140 and the second bit-rate (e.g., 750 Kbps) may be associated with the second group 142. In a particular embodiment, the device 102 may select the particular group with a bit-rate that is nearest the threshold bit-rate 120. For example, the first bit-rate (e.g., 250 Kbps) may be closer to the threshold bit-rate 120 (e.g., 400 Kbps) than the second bit-rate (e.g., 750 Kbps). In this example, the device 102 may select the first group 140.

In another particular embodiment, the threshold bit-rate 120 may represent a maximum bit-rate such that the device 102 may select the particular group with a highest bit-rate that is lower than the threshold bit-rate 120. For example, the first bit-rate (e.g., 250 Kbps) may be nearest to the threshold bit-rate 120 (e.g., 400 Kbps) without exceeding the threshold bit-rate 120 among bit-rates associated with the first group 140 and the second group 142. In this example, the device 102 may select the first group 140. In another particular embodiment, the threshold bit-rate 120 may represent a minimum bit-rate, and the device 102 may select the particular group with a lowest bit-rate that is higher than the threshold bit-rate 120. For example, the second bit-rate (e.g., 750 Kbps) may be nearest the threshold bit-rate 120 (e.g., 400 Kbps) without being less than the threshold bit-rate 120. In this example, the device 102 may select the second group 142.

The device 102 may send a request to a first device of the selected group to request a chunk of the first media content item 170 corresponding to the first bit-rate. For example, the device 102 may send a first request 130, via the peer-to-peer session 152, to the device 162 of the first group 140 to request the first chunk 172. In a particular embodiment, the first chunk 172 may be a beginning chunk of the first media content item 170. The first request 130 may indicate or identify the first chunk 172. For example, the first request 130 may indicate an index number (e.g., 0) of the first chunk 172 in the plurality of chunks of the first media content item 170. The first request 130 may also identify the first media content item 170. For example, the first request 130 may include a title of the first media content item 170, an alphanumeric identifier of the first media content item 170, or both. While sending the first request 130 to the device 162, the device 102 may maintain active peer-to-peer sessions (e.g., the peer-to-peer sessions 150, 152, 154, 156, and 158) with other devices (e.g., the devices 160, 162, 164, 166, and 168).

In response to the first request 130, the device 162 may send the first chunk 172 to the device 102. Chunks of the first media content item 170 may be placed in the buffer 110 prior to display to prevent playback interruptions. For example, the device 102 may receive the first chunk 172 from the device 162 and may place the first chunk 172 in the buffer 110. While receiving the first chunk 172 from the device 162, the device 102 may maintain active peer-to-peer sessions (e.g., the peer-to-peer sessions 150, 152, 154, 156, and 158) with other devices (e.g., the devices 160, 162, 164, 166, and 168).

The device 102 may modify the threshold bit-rate 120 based on a number of chunks in the buffer 110. For example, the device 102 may increase the threshold bit-rate 120 based on determining that more than a threshold number of chunks (e.g., the first threshold number of buffered chunks 184) are in the buffer 110. As another example, the device 102 may decrease the threshold bit-rate 120 based on determining that fewer than another threshold number of chunks (e.g., the second threshold number of buffered chunks 186) are in the buffer 110.

In a particular embodiment, the device 102 may refrain from modifying the threshold bit-rate 120 for a particular duration. For example, the device 102 may refrain from increasing the threshold bit-rate 120 before a threshold duration (e.g., the first threshold duration 180) has elapsed since the threshold bit-rate 120 was previously modified (e.g., increased or decreased). As another example, the device 102 may refrain from decreasing the threshold bit-rate 120 before another threshold duration (e.g., the second threshold duration 182) has elapsed since the threshold bit-rate 120 was previously modified (e.g., increased or decreased). To illustrate, the device 102 may increase the threshold bit-rate 120 based on determining that the threshold bit-rate 120 has not been modified for at least the first threshold duration 180 and that there are more than the first threshold number of buffered chunks 184 in the buffer 110. As another example, the device 102 may decrease the threshold bit-rate 120 based on determining that the threshold bit-rate 120 has not been decreased for at least the second threshold duration 182 and that there are fewer than the second threshold number of buffered chunks 186 in the buffer 110. In a particular embodiment, the device 102 may modify the threshold bit-rate 120 by a particular amount. For example, the device 102 may increase the threshold bit-rate 120 by a first amount. As another example, the device 102 may decrease the threshold bit-rate 120 by a second amount. In a particular embodiment, the first amount, the second amount, or both, may be received via the user input 146 or from another device.

After receiving the first chunk 172, if the threshold bit-rate 120 is not modified, the device 102 may send another request to a device (e.g., the devices 160 or 162) for the second chunk 174 of the first media content item 170 at the same bit-rate. The second chunk 174 may be a subsequent chunk that is after the first chunk 172 in a playback sequence of the plurality of chunks of the first media content item 170.

Alternatively, if the threshold bit-rate 120 is modified after receiving the first chunk 172, the device 102 may select a second group (e.g., the second group 142) based on the modified threshold bit-rate 120. For example, the device 102 may send, via the peer-to-peer session 158, a second request 132 to the device 168. The second request 132 may indicate the second chunk 174. In a particular embodiment, the second request 132 may indicate the second bit-rate associated with the second group 142. The device 102 may receive the second chunk 174 from the device 168.

The device 102 may place the second chunk 174 in the buffer 110. The device 102 may also store the first chunk 172, the second chunk 174, or both, in the memory 106. The device 102 may initiate display of the first chunk 172, the second chunk 174, or both. In a particular embodiment, the first request 130 may include a playback deadline associated with display of the first chunk 172. The playback deadline may indicate a time at which the device 102 expects to initiate display of the first chunk 172. Similarly, the second request 132 may include another playback deadline associated with display of the second chunk 174.

In a particular embodiment, the device 102 may resend a request based on not receiving a response within a threshold duration of sending the request. For example, if the device 102 does not receive the second chunk 174 within the threshold sending duration 128 of sending the second request 132, the device 102 may resend the second request 132 to the device 168. In a particular embodiment, the device 102 may send another request to another device based on not receiving a response within a threshold duration of sending a request. In a particular embodiment, the other device may be of the same group as the device that the request was previously sent to. For example, when the device 102 does not receive the second chunk 174 from the device 168 within the threshold sending duration 128 of sending the second request 132, the device 102 may send a third request 134 (in addition to or an alternative to resending the second request 132) to the device 166 of the second group 142. The third request 134 may indicate the second chunk 174. The device 102 may receive the second chunk 174 from the device 166.

In a particular embodiment, the device 102 may receive a request denied message (e.g., a request denied message 126). For example, the device 102 may receive the request denied message 126 from the device 168 indicating that the second chunk 174 is unavailable. In response to receiving the request denied message 126, the device 102 may send another request (e.g., the third request 134) to another device (e.g., the device 166).

In a particular embodiment, the device 102 may limit a number of concurrent downloads based on the threshold number of concurrent downloads 124. For example, the device 102 may send each of the first request 130 and the second request 132 after determining that a number of chunks being concurrently downloaded from a first subset of devices (e.g., the devices 160, 162, 164, 166, or 168) satisfies the threshold number of concurrent downloads 124. To illustrate, the device 102 may refrain from sending the first request 130, the second request 132, or both, based on determining that a number of chunks being concurrently downloaded from the first subset of devices does not satisfy (e.g., exceeds) the threshold number of concurrent downloads 124. For example, the device 102 may download the first chunk 172 associated with the first request 130. The device 102 may refrain from sending the second request 132 while the first chunk 172 is being downloaded in response to determining that a number of concurrent downloads (e.g., 1) does not satisfy (e.g., is greater than or equal to) a threshold number of concurrent downloads 124 (e.g., 1).

In a particular embodiment, the threshold number of concurrent downloads 124 may correspond to a threshold amount of downlink capacity (e.g., 500 megahertz (MHz)). In this embodiment, the device 102 may refrain from sending a request in response to determining that an amount of downlink capacity being used does not satisfy (e.g., is greater than or equal to) the threshold amount of downlink capacity. For example, the device 102 may refrain from sending the second request 132 in response to determining that an amount of downlink capacity being used while downloading the first chunk 172 does not satisfy (e.g., is greater than or equal to) the threshold amount of downlink capacity (e.g., 500 MHz).

In a particular embodiment, the first subset of devices may include devices associated with other media content items. For example, the device 102 may participate in multiple swarms associated with multiple media content items. The threshold number of concurrent downloads 124 may be used as an overall limit associated with concurrent downloads of chunks of the media content items. In a particular embodiment, the device 102 may delay sending the first request 130, the second request 132, or both, until the number of chunks being concurrently downloaded from the first subset of devices satisfies the threshold number of concurrent downloads 124.

In a particular embodiment, the device 102 may participate in uploading chunks of the first media content item 170 to another device. For example, the device 102 may receive a plurality of requests (e.g., requests 136 and 138) from a first subset (e.g., the devices 164 and 160) of the devices (e.g., the devices 160, 162, 164, 166, and 168). To illustrate, the device 102 may receive the request 136 from the device 164 and may receive the request 138 from the device 160. The first subset may include devices from multiple groups. For example, the first subset may include the device 160 of the first group 140 and may include the device 164 of the second group 142. Each of the requests 136 and 138 may indicate a particular chunk of the first media content item 170. For example, the request 138 may indicate the first chunk 172 and the request 136 may indicate the second chunk 174. The device 102 may respond to either request (or both requests) with the requested chunk (e.g., the first chunk 172 or the second chunk 174). For example, the device 102 may send the first chunk 172 to the device 160, may send the second chunk 174 to the device 164, or both.

In a particular embodiment, the device 102 may limit a number of concurrent uploads based on the threshold number of concurrent uploads 122. For example, the device 102 may send the first chunk 172 and the second chunk 174 after determining that a number of chunks being concurrently uploaded to a first subset of devices (e.g., the devices 160, 162, 164, 166, or 168) satisfies the threshold number of concurrent uploads 122. To illustrate, the device 102 may refrain from sending the first chunk 172, the second chunk 174, or both, based on determining that a number of chunks being concurrently uploaded to the first subset of devices does not satisfy (e.g., exceeds) the threshold number of concurrent uploads 122. In a particular embodiment, the first subset of devices may include devices associated with other media content items. For example, the device 102 may participate in multiple swarms associated with multiple media content items. The threshold number of concurrent uploads 122 may be used as an overall limit associated with concurrent uploads of chunks of the media content items. In a particular embodiment, the device 102 may delay sending the first chunk 172, the second chunk 174, or both, until the number of chunks being concurrently uploaded to the first subset of devices satisfies the threshold number of concurrent uploads 122.

In a particular embodiment, the device 102 may select a request to respond to next based on a playback deadline indicated in the request. For example, the device 102 may identify a request (e.g., the request 138) with an earliest playback deadline of a plurality of playback deadlines corresponding to outstanding requests (e.g., the requests 136 and 138). The device 102 may respond to the identified request 138 next. For example, the device 102 may respond to the request 138 prior to responding to the request 136 based on the playback deadline indicated by the request 138 being earlier than the playback deadline indicated by the request 136. In a particular embodiment, the device 102 may send the first chunk 172 to the device 160 subsequent to playback of the first chunk 172 at a display device coupled to the device 102.

Responding to the playback deadlines in order may reduce the likelihood of a requesting device (e.g., the devices 160 and 164) missing a playback deadline and may also reduce wastage. For example, if the user of the requesting device (e.g., the device 164) with the later playback deadline abandons viewing of the first media content item 170, the device 164 may send a cancel request message to the device 102 prior to the device 102 responding to the request 138 with the second chunk 174. In response to the cancel request message, the device 102 may remove the request 136 from the outstanding requests. For example, the device 102 may refrain from sending the second chunk 174 to the device 164.

In a particular embodiment, the device 102 may determine that by a time that the device 102 is able to respond to a request (e.g., the request 136), the playback deadline indicated in the request may be missed. In response to the determination, the device 102 may not respond to the request 136. Alternatively, the device 102 may respond to the request 136 with a request denied message indicating that the second chunk 174 is unavailable.

Thus, the system 100 utilizes an adaptive bit-rate approach with peer-to-peer devices. The device 102 may maintain peer-to-peer sessions with devices corresponding to various bit-rates associated with the first media content item 170. The device 102 may receive a chunk of the first media content item 170 corresponding to a selected bit-rate when the bit-rate changes due to bit-rate adaptation. The system 100 may take advantage of unused upload capacity of the peer-to-peer devices while having the flexibility to adapt the bit-rate with changing bandwidth availability.

Figure 2:
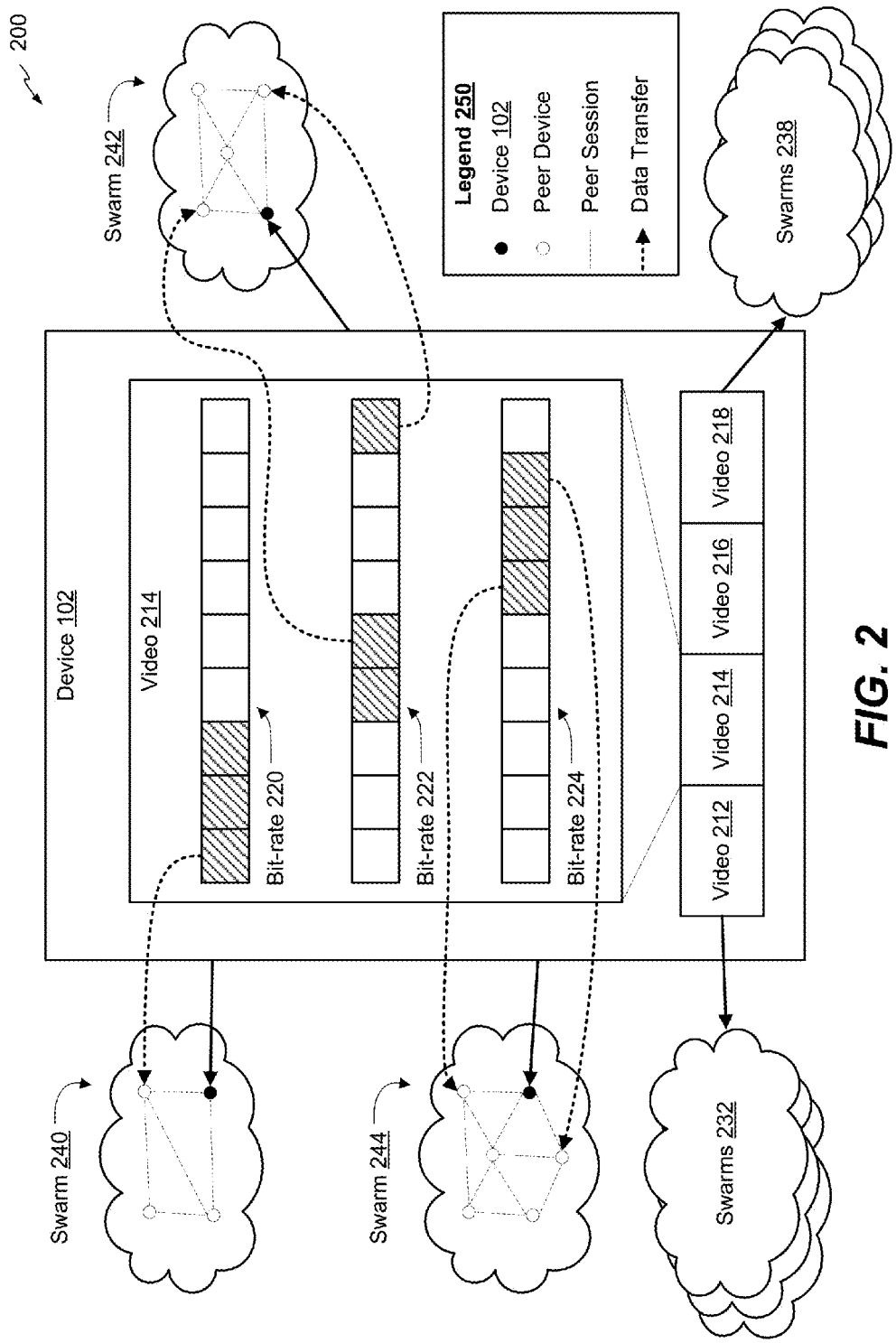
FIG. 2 is a diagram of another illustrative embodiment of a system that uses adaptive bit-rate streaming.

Referring to FIG. 2, a particular illustrative embodiment of a system is disclosed and generally designated 200. The system 200 may include the device 102 of FIG. 1. The device 102 may include or have access to a plurality of media content items (e.g., videos 212, 214, 216, and 218). The device 102 may have access to chunks of a particular media content item corresponding to different bit-rates. For example, the device 102 may have access to a first plurality of chunks of the video 214 corresponding to a bit-rate 220, a second plurality of chunks of the video 214 corresponding to a bit-rate 222, and a third plurality of chunks of the video 214 corresponding to a bit-rate 224.

The device 102 may participate in one or more swarms associated with a particular media content item. For example, the device 102 may participate in the swarms 232 associated with the video 212 and the swarms 238 associated with the video 218. As another example, the device 102 may participate in the swarms 240, 242, and 244 associated with the video 214, where each of the swarms may correspond to a particular bit-rate associated with the video 214. For example, the swarm 240 may correspond to the bit-rate 220, the swarm 242 may correspond to the bit-rate 222, and the swarm 244 may correspond to the bit-rate 224. In a particular embodiment, one or more of the swarms 232, 238, 240, 242, and 244 may correspond to one or more of the first group 140 and the second group 142 of FIG. 1.

The device 102 may establish peer-to-peer sessions with one or more devices of each of the swarms 232, 238, 240, 242, and 244. For example, as illustrated in FIG. 2, the device 102 has a peer-to-peer session with two other devices of the swarm 240. The two other devices have a peer-to-peer session with each other and peer-to-peer sessions with another device of the swarm 240.

During operation, the device 102 may receive requests for chunks of the video 214. The device 102 may send the requested chunks to the requesting devices, as described with reference to FIG. 1. For example, the device 102 may send a first chunk corresponding to the bit-rate 220 to a device of the swarm 240. The device 102 may send multiple different chunks corresponding to the bit-rate 222 to multiple different devices of the swarm 242. The device 102 may also, or in the alternative, send multiple other chunks corresponding to the bit-rate 224 to devices of the swarm 244. In a particular embodiment, a request for a chunk may indicate a corresponding bit-rate. In another embodiment, the device 102 may determine the requested bit-rate based on identifying a swarm of which both the requesting device and the device 102 are members. In a particular embodiment, the device 102 may concurrently send one or more of the requested chunks of the video 214.

Figure 3:
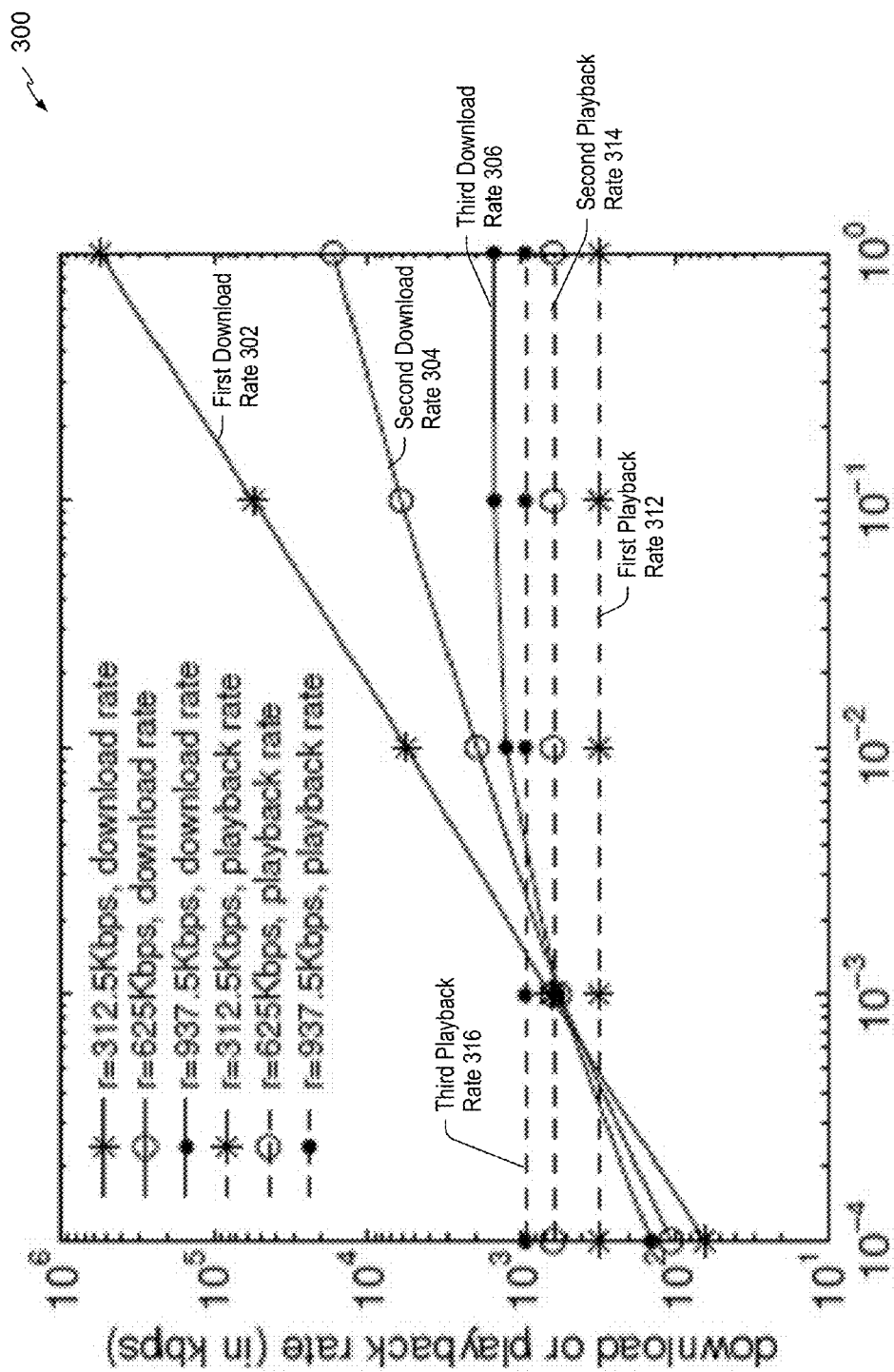
FIG. 3 is a line chart to illustrate a relationship between download and playback rates of a media content item and a popularity of the media content item.

FIG. 3 is a line chart to illustrate a relationship between download rates and playback rates of media content items and popularity of the media content items and is generally designated 300. In an illustrative embodiment, the relationship may be observed in the system 100 of FIG. 1, the system 200 of FIG. 2, or both. In a particular embodiment, the media content items may include the first media content item 170 of FIG. 1.

A horizontal axis (x-axis) of the line chart 300 corresponds to the popularity of the media content items. The popularity of a particular media content item may be based on an arrival rate (A) of devices (e.g., in the system 100 of FIG. 1, the system 200 of FIG. 2, or both) that request the particular media content item. For example, a more popular media content item may have a higher arrival rate than a less popular media content item. The vertical axis (y-axis) of the line chart 300 corresponds to the download rate or playback rate in Kbps of the media content items.

The line chart 300 illustrates the relationship between the download rates and playback rates of the media content items and the popularity of the media content items for three bit-rates (r). The line chart 300 illustrates a first playback rate 312 corresponding to a lower playback bit-rate (e.g., 312.5 Kbps), a second playback rate 314 corresponding to a medium playback bit-rate (e.g., 625 Kbps), and a third playback rate 316 corresponding to a higher playback bit-rate (e.g., 937.5 Kbps). The line chart 300 illustrates a first download rate 302 corresponding to the lower playback bit-rate (e.g., 312.5 Kbps), a second download rate 304 corresponding to the medium playback bit-rate (e.g., 625 Kbps), and a third download rate 306 corresponding to the higher playback bit-rate (e.g., 937.5 Kbps).

The line chart 300 illustrates that the download rates of the media content items increase as the popularity of the media content items increases. For example, a higher download rate may be achievable for a more popular media content item than for a less popular media content item. The line chart 300 also illustrates that, for more popular media content items, the download rate may be higher than the playback rate, especially for the lower bit-rate (e.g., 312.5 Kbps). The line chart 300 further illustrates that, for unpopular media content items, the download rate may be lower than the playback rate, especially for the higher bit-rate (e.g., 937.5 Kbps) and may result in playback interruptions.

Providing all media content items at the same bit-rate may be sub-optimal. For example, providing unpopular media content items at the higher bit-rate (e.g., 937.5 Kbps) may result in playback interruptions. As another example, providing popular media content items at the lower bit-rate (e.g., 312.5 Kbps) or the medium bit-rate (e.g., 625 Kbps) may unnecessarily restrict viewers to poor media playback quality.

The popularity of a media content item may change dynamically and may be difficult to predict. The system 100 of FIG. 1, the system 200 of FIG. 2, or both, may automatically adapt to available bandwidth of a media content item (e.g., the first media content item 170) without using popularity information. For example, the download rate associated with an unpopular media content item may be low. The lower download rate may result in fewer chunks in the buffer 110 than the second threshold number of buffered chunks 186. In response to determining that there are fewer chunks in the buffer 110 than the second threshold number of buffered chunks 186, the device 102 may reduce the threshold bit-rate 120, as further described with reference to FIG. 1. As a result, the playback bit-rate associated with the unpopular media content item may be reduced. As another example, the download rate associated with a popular media content item may be high. The higher download rate may result in more chunks in the buffer 110 than the first threshold number of buffered chunks 184. In response to determining that there are more chunks in the buffer 110 than the first threshold number of buffered chunks 184, the device 102 may increase the threshold bit-rate 120, as further described with reference to FIG. 1. As a result, the playback bit-rate associated with the popular media content item may be increased. Thus, the playback bit-rate may adaptively be increased for popular videos and reduced for unpopular videos.

Figure 4:
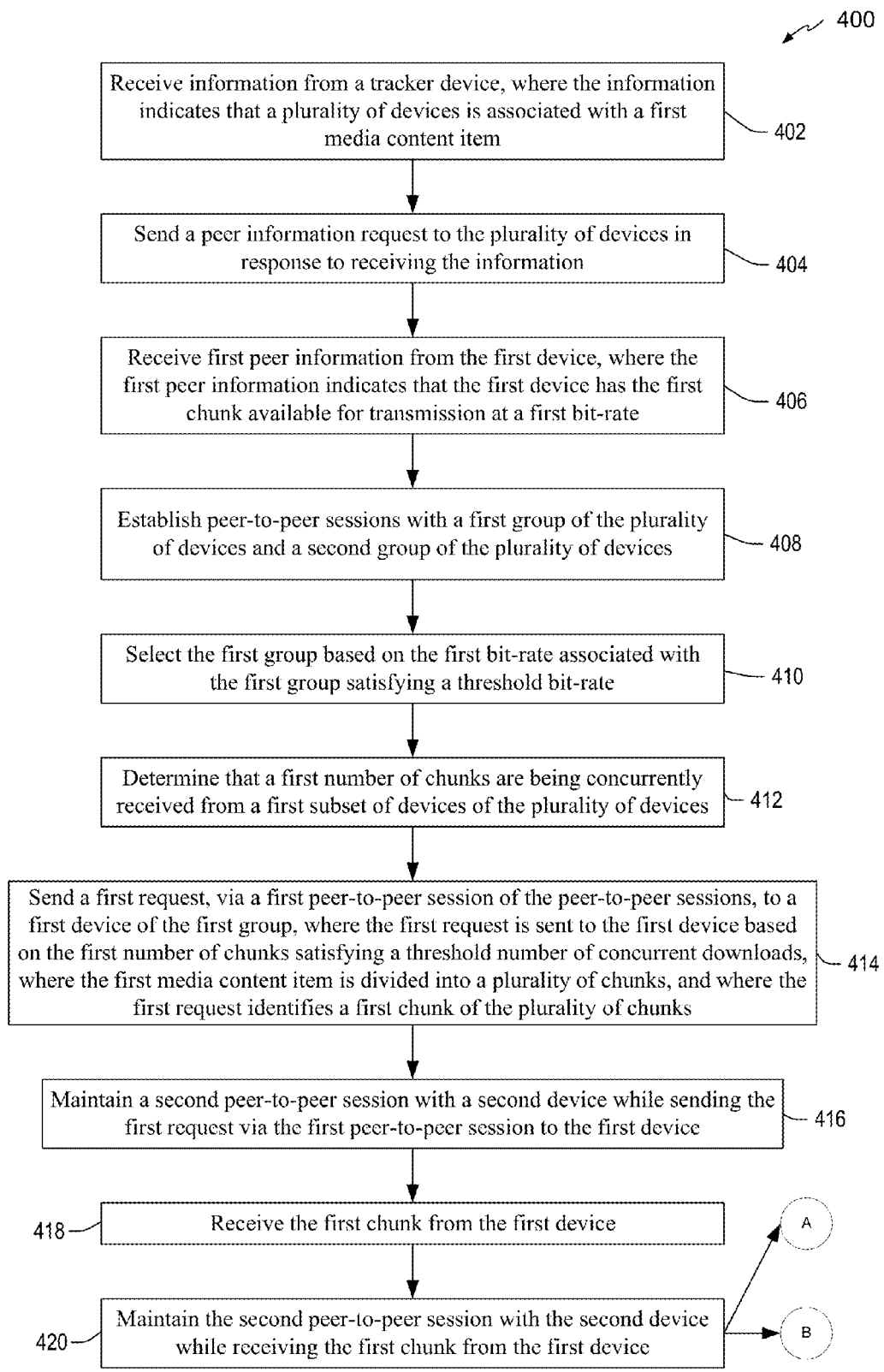
FIG. 4 is a flowchart to illustrate a particular embodiment of a method of adaptive bit-rate streaming.

FIG. 4 is a flowchart to illustrate a particular embodiment of a method 400 of adaptive bit-rate streaming. In an illustrative embodiment, the method 400 may be performed by the system 100 of FIG. 1, the system 200 of FIG. 2, or both.

The method 400 includes receiving information from a tracker device, at 402. The information may indicate that a plurality of devices is associated with a first media content item. For example, the device 102 of FIG. 1 may receive the information 114 from the tracker device 112, as further described with reference to FIG. 1. The information 114 may indicate that the devices 102, 160, 162, 164, 166, and 168 are associated with the first media content item 170.

The method 400 also includes sending a peer information request to the plurality of devices in response to receiving the information, at 404. For example, the device 102 of FIG. 1 may send the first peer information request 116 to the devices 160, 162, 164, 166, and 168 in response to receiving the information 114, as further described with reference to FIG. 1.

The method 400 further includes receiving first peer information from the first device, at 406. The first peer information may indicate that the first device has the first chunk available for transmission at a first bit-rate. For example, the device 102 of FIG. 1 may receive the peer information 118 from the device 162 indicating that the first chunk 172 is available for transmission at the first bit-rate (e.g., 250 Kbps), as further described with reference to FIG. 1.

The method 400 also includes establishing peer-to-peer sessions with a first group of the plurality of devices and a second group of the plurality of devices, at 408. For example, the device 102 may establish the peer-to-peer sessions 150 and 152 with the devices 160 and 162 of the first group 140 and may establish the peer-to-peer sessions 154, 156, and 158 with the devices 164, 166, and 168 of the second group 142, as further described with reference to FIG. 1. In a particular embodiment, each of the peer-to-peer sessions 150, 152, 154, 156, and 158 may correspond to a particular transmission control protocol (TCP) session. Establishing the TCP session may include performing a TCP handshake (e.g., a three way handshake). For example, the peer-to-peer session 150 may be established subsequent to the device 102 sending a session request (e.g., a synchronize (SYN) message) to the device 160, receiving a session request acknowledgment (e.g., a synchronize acknowledgement (SYN-ACK) message) from the device 160, and sending an acknowledgment of the session request acknowledgment (e.g., an acknowledgment (ACK) message) to the device 160.

The method 400 further includes selecting the first group based on the first bit-rate associated with the first group satisfying a threshold bit-rate, at 410. For example, the device 102 may select the first group 140 based on the first bit-rate (e.g., 250 Kbps) associated with the first group 140 satisfying the threshold bit-rate 120, as further described with reference to FIG. 1.

The method 400 also includes determining that a first number of chunks are being concurrently received from a first subset of devices of the plurality of devices, at 412. For example, the device 102 of FIG. 1 may determine that a first number of chunks are being concurrently received from a first subset of devices of the plurality of device (e.g., the devices 160, 162, 164, 166, and 168). For example, the device 102 may determine that a particular number of chunks (e.g., 2) of the first media content item 170 are being concurrently received by the device 102 from the devices 160 and 162. To illustrate, the device 102 may concurrently receive a first previous chunk from the device 160 and a second previous chunk from the device 162. The first previous chunk and the second previous chunk may have previously been requested by the device 102.

The method 400 further includes sending a first request, via a first peer-to-peer session of the peer-to-peer sessions, to a first device of the first group, at 414. The first request may be sent to the first device based on the first number of chunks satisfying a threshold number of concurrent downloads. The first media content item may be divided into a plurality of chunks. The first request may identify a first chunk of the plurality of chunks. For example, the device 102 of FIG. 1 may send the first request 130 via the peer-to-peer session 152 to the device 162 in response to determining that the first number of chunks (e.g., 2) satisfies the threshold number of concurrent downloads 124 (e.g., 5), as further described with reference to FIG. 1.

The method 400 also includes maintaining a second peer-to-peer session with a second device while sending the first request via the first peer-to-peer session to the first device, at 416. For example, the device 102 may maintain the peer-to-peer session 158 with the device 168 while sending the first request 130 via the peer-to-peer session 152 to the device 162, as further described with reference to FIG. 1. For example, the peer-to-peer session 158 may correspond to a TCP session. The device 102 may periodically send a keep alive message (e.g., a message without data and having an ACK flag enabled) to the device 168 and may receive an ACK message from the device 168. The keep alive message may prevent the device 168 from closing the peer-to-peer session 158. Alternatively, if the device 102 does not receive the ACK message in response to the keep alive message, the device 102 may re-establish the peer-to-peer session 158 (e.g., by initiating another TCP handshake with the device 168).

The method 400 further includes receiving the first chunk from the first device, at 418, and maintaining the second peer-to-peer session with the second device while receiving the first chunk from the first device, at 420. For example, the device 102 may receive the first chunk 172 from the device 162 and maintain the peer-to-peer session 158 with the device 168 while receiving the first chunk 172 from the device 162, as further described with reference to FIG. 1.

Maintaining the peer-to-peer session 158 may enable the device 102 to quickly send a request (e.g., the second request 132) to the device 168, as further described with reference to FIG. 5. When the device 102 has an established session (e.g., the peer-to-peer session 158) with the device 168, the device 102 can send a request (e.g., the second request 132) to the device 168 without first performing a session set-up process (e.g., a TCP handshake).

Figure 5:
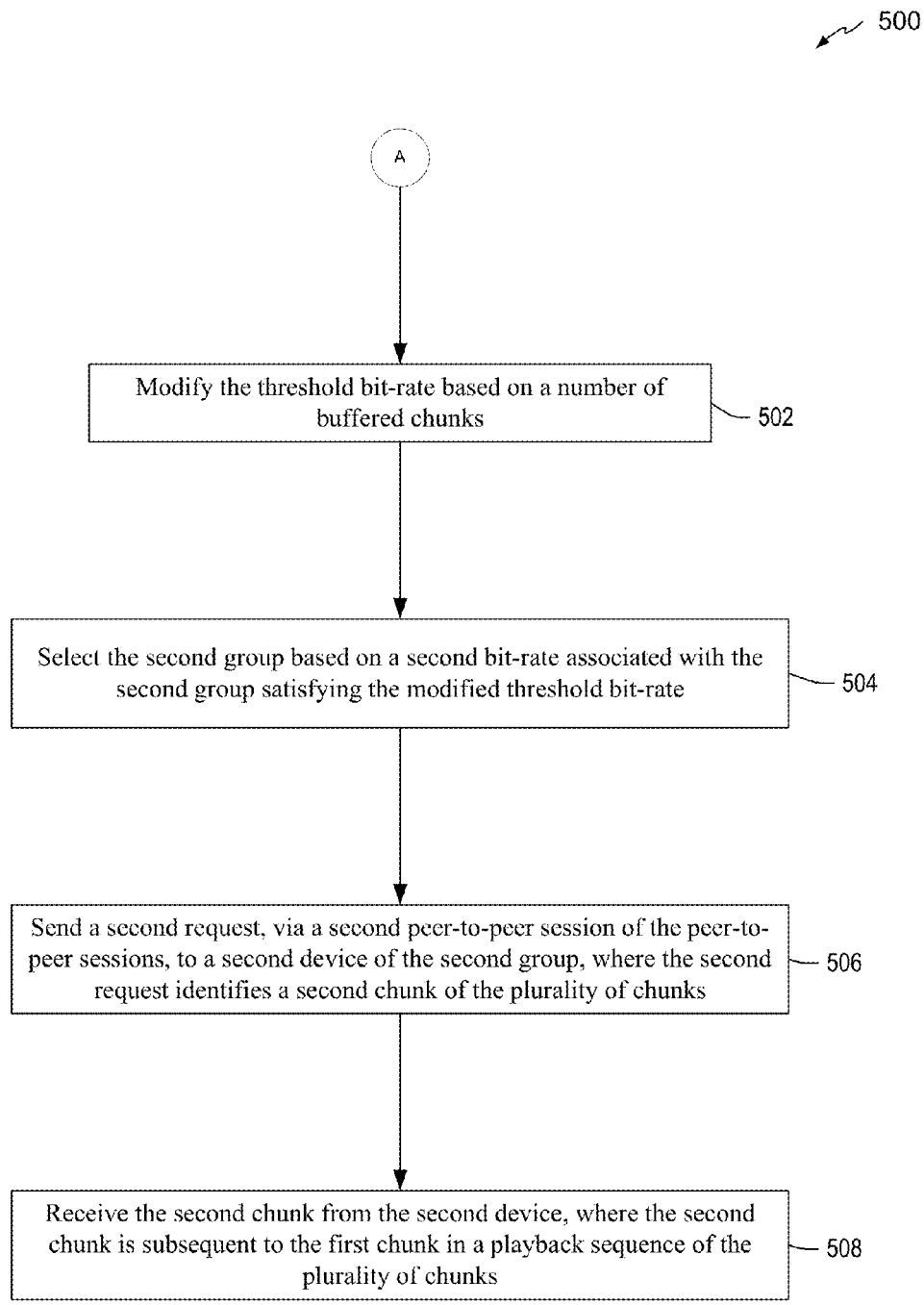
FIG. 5 is a flowchart to illustrate another particular embodiment of a method of adaptive bit-rate streaming.

FIG. 5 is a flowchart to illustrate a particular embodiment of a method 500 of adaptive bit-rate streaming. In an illustrative embodiment, the method 500 may be performed by the system 100 of FIG. 1, the system 200 of FIG. 2, or both. In a particular embodiment, the method 400 of FIG. 4 may continue at a step 502 of the method 500. For example, the methods 400 and 500 may be performed by the device 102 to adaptively modify a playback bit-rate of the first media content item 170.

The method 500 includes modifying the threshold bit-rate based on a number of buffered chunks, at 502. For example, the device 102 may modify the threshold bit-rate 120 based on a number of buffered chunks, as further described with reference to FIG. 1.

The method 500 also includes selecting the second group based on a second bit-rate associated with the second group satisfying the modified threshold bit-rate, at 504. For example, the device 102 may select the second group 142 based on the second bit-rate (e.g., 750 Kbps) associated with the second group 142 satisfying the modified threshold bit-rate 120, as further described with reference to FIG. 1.

The method 500 further includes sending a second request, via a second peer-to-peer session of the peer-to-peer sessions, to a second device of the second group, at 506. The second request may identify a second chunk of the plurality of chunks. For example, the device 102 of FIG. 1 may send the second request 132 via the peer-to-peer session 158 to the device 168 of the second group 142.

The method 500 also includes receiving the second chunk from the second device, at 508. The second chunk may be subsequent to the first chunk in a playback sequence of the plurality of chunks. For example, the device 102 may receive the second chunk 174 from the device 168. Thus, the method 500 may enable adaptive bit-rate streaming in a peer-to-peer environment. The playback bit-rate may adaptively be changed by requesting a next chunk from a swarm that corresponds to a different bit-rate.

Figure 6:
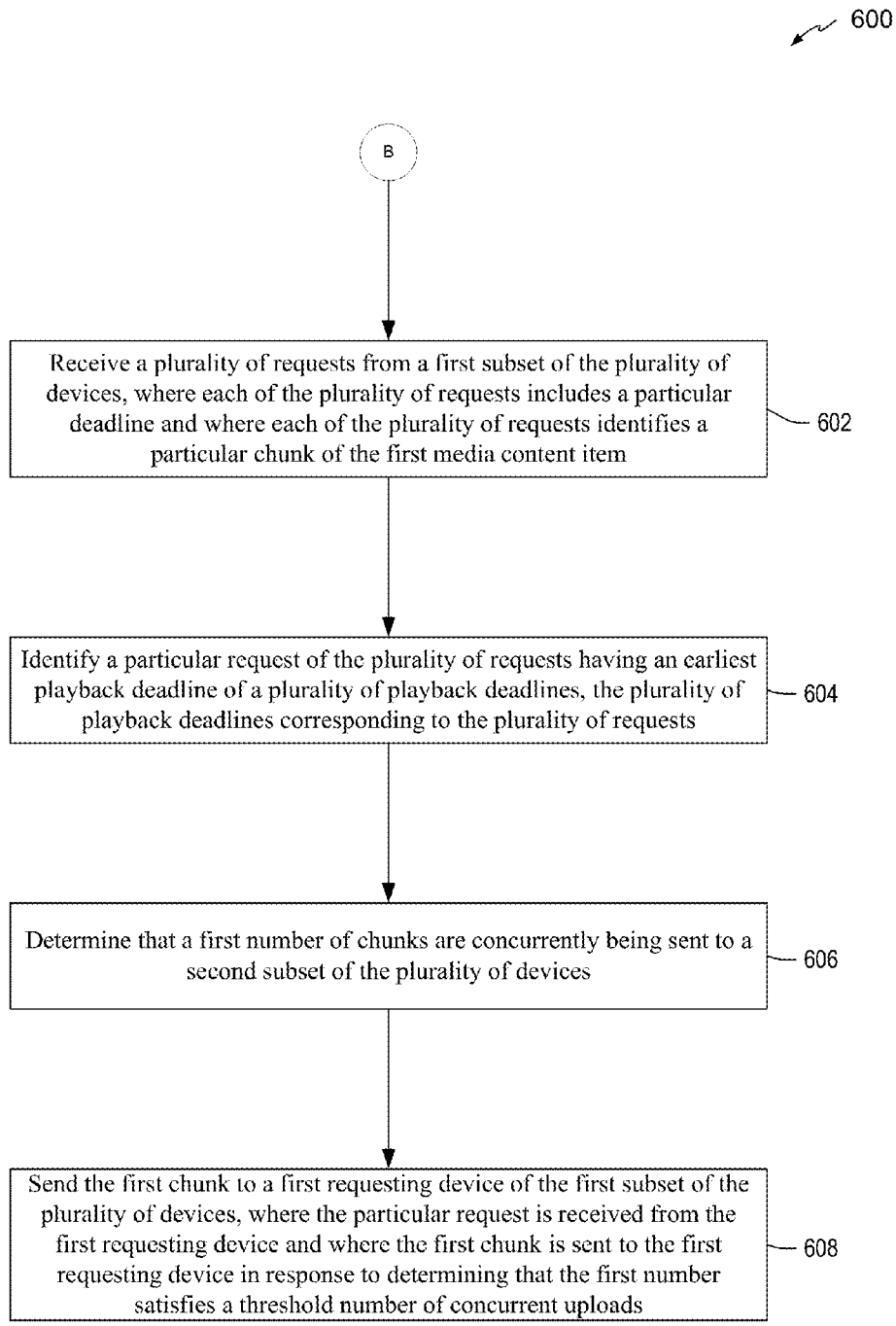
FIG. 6 is a flowchart to illustrate another particular embodiment of a method of adaptive bit-rate streaming.

FIG. 6 is a flowchart to illustrate a particular embodiment of a method 600 of adaptive bit-rate streaming. In an illustrative embodiment, the method 600 may be performed by the system 100 of FIG. 1, the system 200 of FIG. 2, or both. In a particular embodiment, the method 400 of FIG. 4 may continue at a step 602 of the method 600. For example, the methods 400 and 600 may be performed by the device 102 to receive and provide chunks of the first media content item 170 to peer devices.

The method 600 includes receiving a plurality of requests from a first subset of the plurality of devices, at 602. Each of the plurality of requests may include a particular deadline, and each of the plurality of requests may identify a particular chunk of the first media content item. For example, the device 102 may receive requests 136 and 138 from the devices 164 and 160, as further described with reference to FIG. 1. The request 138 may indicate a first playback deadline and the request 136 may indicate a second playback deadline. The request 138 may identify the first chunk 172 and the request 136 may identify the second chunk 174.

The method 600 also includes identifying a particular request of the plurality of requests having an earliest playback deadline of a plurality of playback deadlines, at 604. The plurality of playback deadlines may correspond to the plurality of requests. For example, the device 102 may identify that the request 138 has an earlier deadline based on determining that the first playback deadline is earlier than the second playback deadline, as further described with reference to FIG. 1.

The method 600 further includes determining that a first number of chunks are concurrently being sent to a second subset of the plurality of devices, at 606. For example, the device 102 may determine that a first number of chunks are concurrently being sent to a second subset of the plurality of devices (e.g., the device 160, 162, 164, 166, and 168). For example, the device 102 may determine that a particular number of chunks (e.g., 2) of the first media content item 170 are being concurrently uploaded by the device 102 to the devices 164 and 166. For example, the device 102 may be concurrently uploading a previously requested first chunk to the device 164 and a previously requested second chunk to the device 166.

The method 600 also includes sending the first chunk to a first requesting device of the first subset of the plurality of devices, at 608. The particular request may be received from the first requesting device. The first chunk may be sent to the first requesting device in response to determining that the first number satisfies a threshold number of concurrent uploads. For example, the device 102 may send the first chunk 172 to the device 160 in response to determining that the first number (e.g., 2) satisfies the threshold number (e.g., 5) of concurrent uploads 122, as further described with reference to FIG. 1. If the device 102 determines that the first number does not satisfy the threshold number of concurrent uploads 122, the device 102 may not send the first chunk 172 to the device 160. For example, the device 102 may send a request denied message to the device 160. In a particular embodiment, the device 102 may delay sending the first chunk 172 to the device 160 in response to determining that the first number does not satisfy the threshold number of concurrent uploads 122. For example, the device 102 may periodically determine the first number of chunks that are concurrently being sent by the device 102. The first number may change when the device 102 finishes sending one or more of the chunks. The device 102 may send the first chunk 172 to the device 160 when the first number satisfies (e.g., is less than or equal to) the threshold number of concurrent uploads 122. Thus, the method 600 may enable adaptive bit-rate streaming in a peer-to-peer environment. Requests from peers with earlier playback deadlines may be given a higher priority to reduce the likelihood of missed playback deadlines and playback interruptions.

Figure 7:
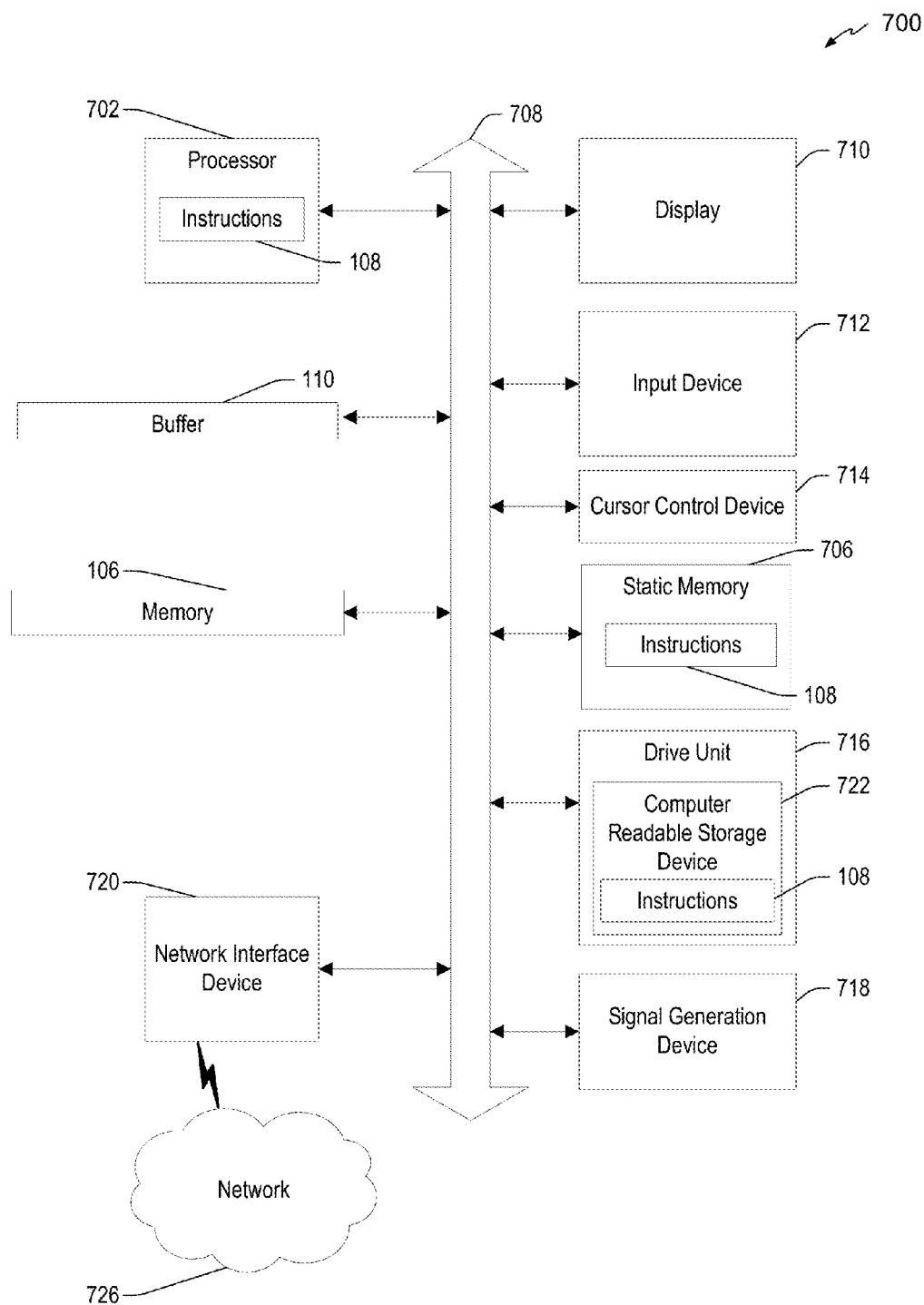
FIG. 7 is a block diagram of an illustrative embodiment of a general computer system operable to support embodiments of computer-implemented methods, computer program products, and system components as illustrated in FIGS. 1-6.

FIG. 7 is a block diagram illustrating an embodiment of a general computer system that is generally designated 700. The computer system 700 may be operable to support embodiments of computer-implemented methods, computer program products, and system components as illustrated in FIGS. 1-6. In a particular embodiment, the computer system 700 may correspond to, or may be included in, the device 102 of FIG. 1 or FIG. 2, the tracker device 112 of FIG. 1, or a combination thereof. The computer system 700 may be coupled to, or in communication with, other computer systems or peripheral devices.

In a particular embodiment, the computer system 700 may be operable to perform one or more of the methods 400-600, as illustrated in FIGS. 4-6. For example, the computer system 700 may be operable to receive information, send a peer information request, receive first peer information, establish peer-to-peer sessions, select a first group, determine a first number of chunks, send a first request, maintain a second peer-to-peer session while sending the first request, receive a first chunk, and maintain the second peer-to-peer connection while receiving the first chunk, as further described with reference to FIG. 4. As another example, the computer system 700 may be operable to modify a threshold bit-rate, select a second group, send a second request, and receive a second chunk, as further described with reference to FIG. 5. As a further example, the computer system 700 may be operable to receive a plurality of requests, identify a particular request, determine a first number of chunks, and send a first chunk, as further described with reference to FIG. 6.

The computer system 700 may be implemented as or incorporated into various devices, such as a tablet computer, a personal digital assistant (PDA), a palmtop computer, a laptop computer, a smart phone, a communications device, a web appliance, a display device, a computing device, or any other machine capable of executing a set of instructions (sequential or otherwise) that specify actions to be taken by that machine. Further, while a single computer system 700 is illustrated, the term "system" shall also be taken to include any collection of systems or sub-systems that individually or jointly execute a set, or multiple sets, of instructions to perform one or more computer functions.

As illustrated in FIG. 7, the computer system 700 includes a processor 702, e.g., a central processing unit (CPU). In a particular embodiment, the processor 702 may correspond to the processor 104 of FIG. 1. In a particular embodiment, the processor 702 may include multiple processors. For example, the processor 702 may include distributed processors, parallel processors, or both. The multiple processors may be included in, or coupled to, a single device or multiple devices. The processor 702 may include a virtual processor. In a particular embodiment, the processor 702 may include a state machine, an application specific integrated circuit (ASIC), or a programmable gate array (PGA) (e.g., a field PGA).

Moreover, the computer system 700 may include a main memory (e.g., the memory 106 of FIG. 1) and a static memory 706 that may communicate with each other via a bus 708. In a particular embodiment, the main memory 704 includes the instructions 108 of FIG. 1. As shown, the computer system 700 may further include or be coupled to a display unit 710, such as a liquid crystal display (LCD), an organic light emitting diode (OLED), a flat panel display, a solid-state display, or a projection display. Additionally, the computer system 700 may include an input device 712, such as a keyboard, a remote control device, and a cursor control device 714, such as a mouse. In a particular embodiment, the cursor control device 714 may be incorporated into the remote control device. The computer system 700 may also include a disk drive unit 716, a signal generation device 718, such as a speaker, and a network interface device 720. The network interface device 720 may be coupled to other devices (not shown) via a network 726. For example, the network interface device 720 may be coupled to one or more of the devices 102, 160, 162, 164, 166, 168, and the tracker device 112 of FIG. 1. In a particular embodiment, one or more of the components of the computer system 700 may correspond to, or be included in, one or more of the devices 102, 160, 162, 164, 166, 168, and the tracker device 112 of FIG. 1.

In a particular embodiment, as depicted in FIG. 7, the disk drive unit 716 may include a tangible computer-readable storage device 722 in which one or more sets of instructions 108, e.g. software, may be embedded. Further, the instructions 108 may embody one or more of the methods or logic as described herein. In a particular embodiment, the instructions 108 may reside completely, or at least partially, within the memory 106, the static memory 706, and/or within the processor 702 during execution by the computer system 700. The processor 702 may execute the instructions 108 to perform operations corresponding to one or more of the methods or logic as described herein. The processor 702 may perform the operations directly, or the processor 702 may facilitate, direct, or cooperate with another device or component to perform the operations.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limiting embodiment, implementations can include distributed processing and parallel processing. Alternatively, virtual computer system processing can be used to implement one or more of the methods or functionality as described herein.

The present disclosure describes a computer-readable storage device that includes instructions 108 to enable adaptive bit-rate streaming. Further, the instructions 108 may be transmitted or received over the network 726 via the network interface device 720 (e.g., via uploading and/or downloading of an adaptive bit-rate streaming application or program, or both).

While the computer-readable storage device is shown to be a single device, the term "computer-readable storage device" includes a single device or multiple devices, such as centralized or distributed storage, and/or associated caches that store one or more sets of instructions. The term "computer-readable storage device" shall also include any device that is capable of storing a set of instructions for execution by a processor or that causes a computer system to perform any one or more of the methods or operations disclosed herein.

In a particular non-limiting, exemplary embodiment, the computer-readable storage device can include a solid-state memory such as a memory card or other package that houses one or more non-volatile read-only memories. Further, the computer-readable storage device can be a random access memory or other volatile re-writable memory. Additionally, the computer-readable storage device can include a magneto-optical or optical medium, such as a disk or tapes. A computer-readable storage device is an article of manufacture and is not a signal.

It should also be noted that software that implements the disclosed methods may be stored on a storage device, such as: a disk or tape; a magneto-optical or optical device, such as a disk; or a solid state device, such as a memory card or other package that houses one or more read-only (non-volatile) memories, random access memories, or other re-writable (volatile) memories.

Although the present specification describes components and functions that may be implemented in particular embodiments with reference to particular standards and protocols, the claims are not limited to such standards and protocols. For example, standards for Internet, other packet switched network transmission and standards for viewing media content represent examples of the state of the art. Such standards are periodically superseded by faster or more efficient equivalents having essentially the same functions. Accordingly, replacement standards and protocols having the same or similar functions as those disclosed herein are considered equivalents thereof.

Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. As the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
   receiving information, at a user device from a tracker device, wherein the information indicates that a plurality of devices is associated with a media content item;
   initiating, with the user device, peer-to-peer sessions with devices of groups of the plurality of devices, wherein each of the groups is associated with a different playback bit-rate for playback of the media content item;
   selecting, with the user device, a first group from the groups of the plurality of devices based on a first playback bit-rate associated with the first group satisfying a threshold playback bit-rate for playback of the media content item associated with the user device;
   sending a first request, via a first peer-to-peer session of the peer-to-peer sessions, from the user device to a first device of the first group, wherein the media content item is divided into a plurality of chunks, and wherein the first request identifies a first chunk of the plurality of chunks;
   buffering the first chunk at the user device; and
   in response to a number of buffered chunks of the media content item being less than a first threshold or being greater than a second threshold, wherein the first threshold corresponds to a first playback duration that is less than a second playback duration corresponding to the second threshold, and in response to a duration of use of the first group exceeding a duration threshold:
     modifying, at the user device, the threshold playback bit-rate to a modified threshold playback bit-rate;
     selecting, with the user device, a particular group of the groups based on a particular playback bit-rate associated with the particular group satisfying the modified threshold playback bit-rate; and
     sending a second request, via one of the peer-to-peer sessions, from the user device to a particular device of the particular group, wherein the second request identifies a second chunk of the plurality of chunks.

2. The method of claim 1, wherein modifying the threshold playback bit-rate comprises:
   decreasing the threshold playback bit-rate by a first amount in response to the number of buffered chunks satisfying the first threshold; and
   increasing the threshold playback bit-rate by a second amount in response to the number of buffered chunks satisfying the second threshold.

3. The method of claim 1, further comprising, in response to the duration of use of the first group not exceeding the duration threshold, sending the second request, via one of the peer-to-peer sessions, from the user device to a device of the first group.

4. The method of claim 1, further comprising determining that a first number of chunks are being concurrently received from a first subset of devices of the plurality of devices, wherein the first request is sent to the first device based on the first number of chunks satisfying a threshold number of concurrent downloads.

5. The method of claim 1, wherein the duration threshold is a first time period when the number of buffered chunks satisfies the first threshold.

6. The method of claim 5, wherein the duration threshold is a second time period when the number of buffered chunks satisfies the second threshold.

7. The method of claim 1, further comprising receiving the second chunk from the particular device, wherein the second chunk is subsequent to the first chunk in a playback sequence of the plurality of chunks.

8. The method of claim 1, further comprising:
   sending a peer information request to the plurality of devices in response to receiving the information; and
   receiving first peer information from the first device, wherein the first peer information indicates that the first device has the first chunk available for transmission at the first playback bit-rate, and wherein the first group is selected based on the first peer information.

9. The method of claim 1, further comprising:
   receiving a plurality of requests from a first subset of the plurality of devices, wherein each of the plurality of requests includes a particular playback deadline and wherein each of the plurality of requests identifies a particular chunk of the media content item;

identifying a particular request of the plurality of requests having an earliest playback deadline of a plurality of playback deadlines, the plurality of playback deadlines corresponding to the plurality of requests; and sending the first chunk to a first requesting device of the first subset of the plurality of devices, wherein the particular request is received from the first requesting device.

10. The method of claim 9, further comprising, in response to a determination that a playback deadline of a second request of the plurality of requests cannot be met, sending a request denied message to a second requesting device associated with the second request.

11. The method of claim 9, further comprising concurrently receiving the second chunk from the particular device and sending the first chunk to the first requesting device.

12. A device comprising:
a processor; and
a memory storing instructions that, when executed by the processor, cause the processor to perform operations comprising:
  receiving information, wherein the information identifies a plurality of devices that store a segment of a media content item;
  initiating peer-to-peer sessions with a first group of the plurality of devices and a second group of the plurality of devices;
  selecting the first group based on a first playback bit-rate associated with the first group satisfying a threshold playback bit-rate for playback of the media content item via the device;
  sending a first request, via a first peer-to-peer session of the peer-to-peer sessions, to a first device of the first group, wherein the media content item includes a plurality of segments, and wherein the first request identifies a first segment of the plurality of segments;
  buffering the first segment from the first device;
  in response to a number of buffered chunks of the media content item being less than a first threshold or being greater than a second threshold, wherein the first threshold corresponds to a first playback duration that is less than a second playback duration corresponding to the second threshold, and in response to a duration of use of the first group exceeding a duration threshold, modifying the threshold playback bit-rate to a modified threshold playback bit-rate;
  selecting the second group based on a second playback bit-rate associated with the second group satisfying the modified threshold playback bit-rate; and
  sending a second request, via a second peer-to-peer session of the peer-to-peer sessions, to a second device of the second group, wherein the second request identifies a second segment of the plurality of segments.

13. The device of claim 12, wherein a particular peer-to-peer session is initiated based on determining that a first number of peer-to-peer sessions satisfy a threshold number of peer-to-peer sessions.

14. The device of claim 12, wherein a playback length of each of the plurality of segments is equal.

15. The device of claim 12, wherein the operations further comprise, in response to not receiving the second segment from the second device within a threshold duration of sending the second request, resending the second request to the second device, sending a third request to a third device of the second group, or both.

16. The device of claim 12, wherein the operations further comprise:
  receiving a request denied message from the second device, the request denied message indicating that the second segment is unavailable; and
  sending a third request to a third device of the second group in response to the request denied message.

17. The device of claim 12, wherein the first request includes a playback deadline for the first segment.

18. A computer-readable storage device storing instructions that, when executed by a processor, cause the processor to perform operations comprising:
  receiving information, wherein the information indicates that a plurality of devices is associated with a media content item;
  initiating peer-to-peer sessions with a first group of the plurality of devices and a second group of the plurality of devices;
  selecting the first group based on a first playback bit-rate associated with the first group satisfying a threshold playback bit-rate for playback of the media content item;
  sending a first request, via a first peer-to-peer session of the peer-to-peer sessions, to a first device of the first group, wherein the media content item is divided into a plurality of chunks, and wherein the first request identifies a first chunk of the plurality of chunks;
  buffering the first chunk from the first device; and
  in response to a number of buffered chunks of the media content item being less than a first threshold or being greater than a second threshold, wherein the first threshold corresponds to a first playback duration that is less than a second playback duration corresponding to the second threshold and in response to a duration of use of the first group exceeding a duration threshold, modifying the threshold playback bit-rate to a modified threshold playback bit-rate;
  selecting the second group based on a second playback bit-rate associated with the second group satisfying the modified threshold playback bit-rate; and
  sending a second request, via a second peer-to-peer session of the peer-to-peer sessions, to a second device of the second group, wherein the second request identifies a second chunk of the plurality of chunks.

19. The computer-readable storage device of claim 18, wherein the operations further comprise:
  receiving a plurality of requests from a first subset of the plurality of devices, wherein each of the plurality of requests identifies a particular chunk of the plurality of chunks and a playback deadline of the particular chunk;
  identifying a particular request of the plurality of requests based on a first playback deadline of the particular request; and
  sending the first chunk to a requesting device of the plurality of devices, wherein the particular request is received from the requesting device and wherein the particular request identifies the first chunk.

20. The computer-readable storage device of claim 19, wherein the operations further comprise initiating playback of the first chunk at a display device, wherein the first chunk is sent to the requesting device subsequent to playback of the first chunk at the display device.

* * * * *